United States Patent
Pape et al.

(10) Patent No.: US 9,849,542 B2
(45) Date of Patent: Dec. 26, 2017

(54) METHOD FOR PREPARING A WORKPIECE FOR SUBSEQUENT LASER WELDING AND METHOD FOR JOINING WORKPIECES THROUGH LASER WELDING WITH LAP JOINT

(71) Applicant: Audi AG, Ingolstadt (DE)

(72) Inventors: Sandro Pape, Ingolstadt (DE); Manfred Breitmoser, Riedenburg (DE); Gerhard Gaull, Neuburg (DE)

(73) Assignee: AUDI AG, Ingolstadt (DE)

( * ) Notice: Subject to any disclaimer, the term of this patent is extended or adjusted under 35 U.S.C. 154(b) by 426 days.

(21) Appl. No.: 14/695,950

(22) Filed: Apr. 24, 2015

(65) Prior Publication Data

US 2015/0306708 A1 Oct. 29, 2015

(30) Foreign Application Priority Data

Apr. 25, 2014 (DE) .................. 10 2014 006 077

(51) Int. Cl.
| | |
|---|---|
| *B23K 26/16* | (2006.01) |
| *B23K 26/32* | (2014.01) |
| *B23K 26/322* | (2014.01) |
| *B23K 26/00* | (2014.01) |
| *B23K 26/08* | (2014.01) |
| *B23K 26/082* | (2014.01) |
| *B23K 26/244* | (2014.01) |
| *B23K 26/60* | (2014.01) |

(Continued)

(52) U.S. Cl.
CPC ........ *B23K 26/0081* (2013.01); *B23K 26/082* (2015.10); *B23K 26/0876* (2013.01); *B23K 26/244* (2015.10); *B23K 26/361* (2015.10); *B23K 26/60* (2015.10); *B23K 2201/006* (2013.01); *B23K 2201/18* (2013.01); *B23K 2201/34* (2013.01); *B23K 2203/08* (2013.01)

(58) Field of Classification Search
CPC ...... B23K 26/16; B23K 26/32; B23K 26/322; B23K 11/166
USPC .......... 219/121.64, 121.69, 121.85; 228/174, 228/176
See application file for complete search history.

(56) References Cited

U.S. PATENT DOCUMENTS

| | | | | |
|---|---|---|---|---|
| 4,409,278 A | * | 10/1983 | Jochym | B23K 35/001 228/124.1 |
| 6,844,522 B1 | * | 1/2005 | Wang | B23K 33/00 219/121.64 |

(Continued)

FOREIGN PATENT DOCUMENTS

| | | |
|---|---|---|
| CN | 1350903 | 5/2002 |
| CN | 102120288 | 7/2011 |

(Continued)

OTHER PUBLICATIONS

Chinese Search Report dated May 13, 2016 with respect to counterpart Chinese patent application 201510200885.4.

(Continued)

*Primary Examiner* — Samuel M Heinrich
(74) *Attorney, Agent, or Firm* — Henry M. Feiereisen LLC

(57) ABSTRACT

In a method for preparing a workpiece for subsequent laser welding, a recessed structure in the form of at least two grooved line elements is formed by a laser beam in a surface of the workplace, with the line elements having a common starting point from which the laser beam moves onwards to produce the line elements. Solidifying material melt of the workpiece is hereby accumulated in an area of the starting point to produce a nub-like elevation sized to extend out beyond the surface of the workpiece.

17 Claims, 2 Drawing Sheets

(51) Int. Cl.
- *B23K 26/361* (2014.01)
- *B23K 101/00* (2006.01)
- *B23K 101/18* (2006.01)
- *B23K 101/34* (2006.01)
- *B23K 103/08* (2006.01)

(56) References Cited

U.S. PATENT DOCUMENTS

| | | | | |
|---|---|---|---|---|
| 2001/0047983 A1* | 12/2001 | Degawa | ............... | B23K 33/004 219/121.64 |
| 2005/0266264 A1 | 12/2005 | Becker et al. | | |

FOREIGN PATENT DOCUMENTS

| | | |
|---|---|---|
| CN | 102554469 | 7/2012 |
| DE | 39 09 471 | 9/1990 |
| DE | 102 61 655 | 7/2004 |
| DE | 102004020241 | 12/2004 |
| DE | 102004008108 | 9/2005 |
| DE | 102004025031 | 11/2005 |
| EP | 0 748 268 | 11/1997 |
| JP | 11-47967 | 2/1999 |

OTHER PUBLICATIONS

Translation of Chinese Search Report dated May 13, 2016 with respect to counterpart Chinese patent application 201510200885.4.

\* cited by examiner

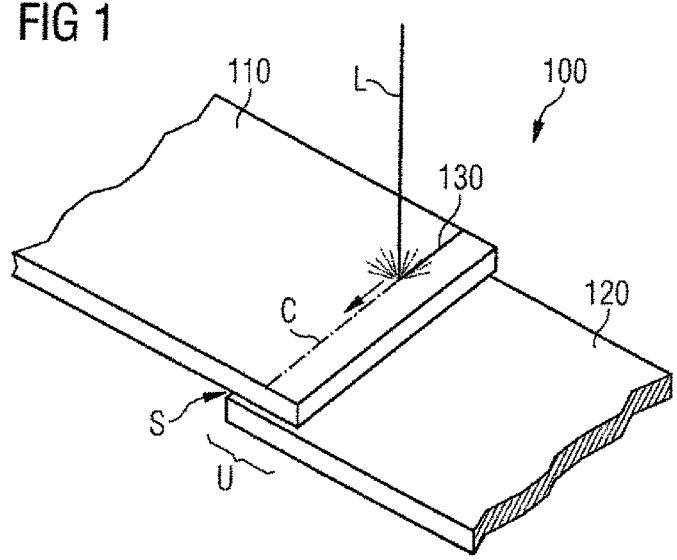
FIG 1
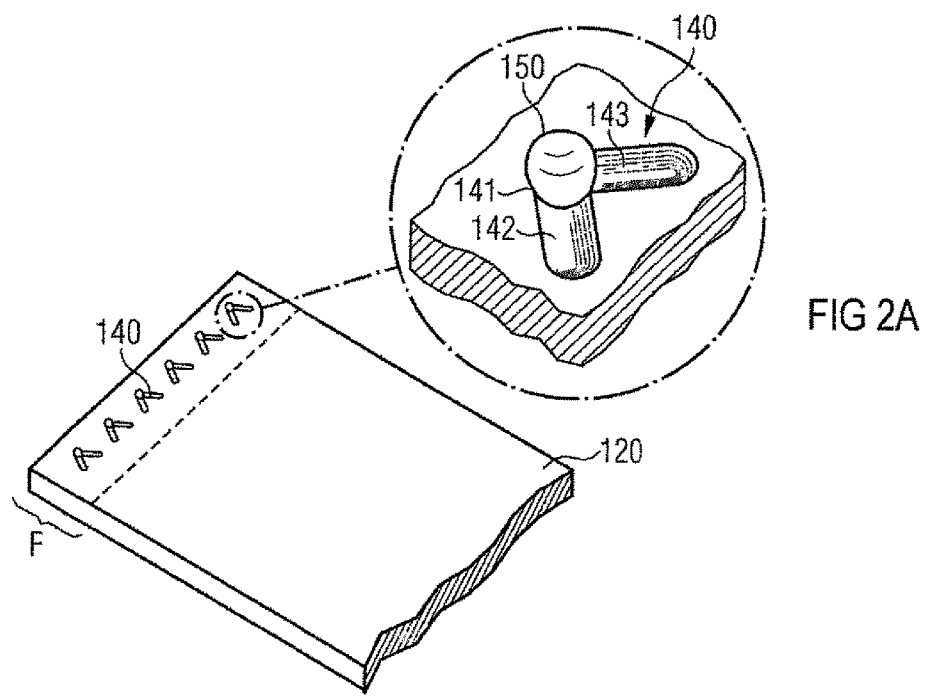
FIG 2
FIG 2A

METHOD FOR PREPARING A WORKPIECE FOR SUBSEQUENT LASER WELDING AND METHOD FOR JOINING WORKPIECES THROUGH LASER WELDING WITH LAP JOINT

CROSS-REFERENCES TO RELATED APPLICATIONS

This application claims the priority of German Patent Application, Serial No. 10 2014 006 077.2, filed Apr. 25, 2014, pursuant to 35 U.S.C. 119(a)-(d), the disclosure of which is incorporated herein by reference in its entirety as if fully set forth herein.

BACKGROUND OF THE INVENTION

The present invention relates to a method for preparing a workpiece for subsequent laser welding. The present invention also relates to a method for joining workpieces through laser welding with lap joint, with one of the workpieces being coated.

The following discussion of related art is provided to assist the reader in understanding the advantages of the invention, and is not to be construed as an admission that this related art is prior art to this invention.

In laser welding with lap joint, evaporating workpiece materials and/or other gaseous welding emissions cause excess pressure between the workpieces that adversely affects the weld seam being generated. This is especially critical, when at least one the workpieces being joined is coated, e.g. galvanized.

It would be desirable and advantageous to obviate prior art shortcomings.

SUMMARY OF THE INVENTION

According to one aspect of the present invention, a method for preparing a workpiece for subsequent laser welding includes moving a laser beam from a common starting point onward to produce in a surface of the workpiece a recessed structure in the form of at least two grooved line elements that meet in the common starting point and thereby accumulate solidifying material melt of the workpiece in an area of the common starting point to produce a nub-like elevation sized to extend out beyond the surface of the workpiece.

In order to prepare a workpiece for subsequent laser welding or laser beam welding (with lap joint), the present invention resolves prior art problems by using a laser beam to form depressions in the surface of the workpiece in a joining region with another workpiece, which joining region involves a workpiece zone that corresponds to an overlap region of the lap joint. The depressions define in the joining region a recessed structure in the form of two grooved line elements which have a common starting point for the laser beam. Due to heat application by the laser beam, material melts which, as it solidifies, is deliberately accumulated or builds up in the area of the common starting point by the laser beam as it moves onward in different directions, to thereby produce a nub-like elevation which extends out beyond the workpiece surface.

Advantageously, several recessed structures with respective nub-like elevations can be formed in the involved joining region. The elevations may hereby be configured identical or different. In this way, the workpieces contact one another tilt-free in the overlap region, when undergoing laser welding.

The workpiece may be made of sheet metal and may also be coated at least at a side intended for connection with another workpiece. An example of a coating includes a zinc coating (galvanization).

The recessed structure in the form of grooved depressions are formed by a laser beam or similar energy beam which is controlled to move along a respective path on the workpiece surface once or several times in succession, with the path being defined by a starting point, an end point, and a course of the path. A grooved depression is realized as the workpiece material and in particular the coating material melts and evaporates along the path. As the laser beam moves onward from the common starting point, melt accumulates at the starting point as the melt is virtually shifted backwards towards the starting point in opposite direction of the advancing laser beam.

In accordance with the present invention, the recessed structure may include a plurality of grooved line elements or linear depressions with a common staring point so that during formation of such a recessed structure by the laser beam as it moves in various directions from the common starting point, solidifying workpiece melt accumulates at the common starting point, i.e. in the area of the starting point, because the melt is transported in the direction of the common starting point, to ultimately form incrementally and successively a nub-like elevation that extends out beyond the workpiece surface. In other words, with the assistance of a laser beam, several, advantageously short, grooved depressions (lasersteps) are produced in the joining region of the involved workpiece, with the generated melt accumulations establishing a nub-like elevation in the area of the common starting point.

Such an elevation serves as a spacer during subsequent laser welding between the workpieces to be welded together in the overlap or joining region to thereby form a degassing gap which in combination with the grooved depressions provides ample escape for evaporating workpiece material, especially coating material, or other gaseous welding emissions. The size of the degassing gap, i.e. the distance between the workpieces, is determined by the height of the elevations in the overlap region.

A line element or linear depression of a recessed structure to be formed may have a straight configuration or a curved or arcuate configuration. Advantageously, the line element may have a length of 1.0 mm to 5.0 mm, preferably 1.5 mm to 2.5 mm. Currently preferred is a length of about 2.0 mm. In terms of heat input, the provision of short line elements is advantageous. The depth of the line elements can be adjusted by the laser beam output and/or varying speeds by which the laser beam is advanced, or, optionally, by moving the laser beam along a path several times to form the line element. The line elements advantageously are dimensioned to penetrate through the workpiece coating and to reach the base material. The line elements of the recessed structure may be identical or different.

According to another advantageous feature of the present invention, the line elements can be formed sequentially in time with the same laser beam. Suitably, the line elements are formed immediately one after the other with the same laser beam. In other words, the laser beam forms first one line element, then the next line element, and so on, with the laser beam moving repeatedly onward from the common starting point in different directions so as to realize in increments from different directions a successive accumulation of solidified workpiece melt in the area of the starting point. The laser beam is hereby moved at appropriate travel speed and has also an appropriate laser output. This can easily be realized, e.g., by conducting preliminary tests.

The use of a so-called scanner optics is advantageous for guiding and steering the laser beam, with the scanner optics mounted in particular onto a robot arm or the like. An example of a scanner optics is described e.g. in EP 0 748 268 B1, to which reference is made herewith. The use of a scanner optics provides broad freedom of design for the recessed structure, e.g. in terms of number and length of the line elements being formed. In addition, travel speed of the laser beam, its output and/or its focus can easily be modified, in particular also during formation of the recessed structure. Also the formation of a recessed structure from spatially formed joining regions is possible.

According to another advantageous feature of the present invention, the recessed structure may include two line elements arranged wedge-shaped or V-shaped in relation to one another. The line elements may extend at any angle in relation to one another, e.g. >0° to <360°. Currently preferred is an angle between the line elements of about 90°, thereby establishing a right-angled arrangement. Advantageously, the recessed structure may be formed by at least three grooved line elements arranged in a star-shaped configuration. Advantageously, the line elements in star-formation are spaced from one another at same angular distances.

Advantageously, the joining region of the workpiece may have several recessed structures, e.g. at a distance between neighboring recessed structures of 2.0 mm to 10.0 mm, in particular from 2.5 mm to 5.0 mm. These distance dimensions may relate to a mean distance. Currently preferred is the provision of same distances between the recessed structures. The recessed structures in a joining region may be identical or different.

The workpiece may generally involve a metallic body, e.g. casting, milled part, profile, or the like. Advantageously, the workpiece is a sheet metal workpiece or sheet-metal-like workpiece. The coating may involve a metallic corrosion-resistant coating, and may contain zinc. As such the coating may be designated as a zinc coating or galvanized coating.

According to another aspect of the present invention, a method of joining at least two workpieces, with at least one of the workpieces being coated, includes moving a laser beam from a common starting point onward to produce in a surface of at least one of the workpieces in a joining region with the other one of the workpieces a plurality of recessed structures, each in the form of at least two grooved line elements that meet in the common starting point and thereby accumulate solidifying material melt of the at least one of the workpieces in an area of the common starting point to produce a plurality of nub-like elevations sized to extend out beyond the surface of the at least one of the workpieces, positioning and aligning the workpieces such as to form a degassing gap in a region of overlap of the workpieces, and joining the workpieces through laser welding, with evaporating coating material being able to escape via the degassing gap.

This method may also be applied as a laser welding process for the production of a workpiece composite from at least two workpieces, with one of the workpieces being coated. The workpiece composite may involve a component or body part of a vehicle body.

Advantageously, the recessed structure and elevations in the joining region of the at least one workpiece are formed in close proximity of the laser weld being generated, i.e. the laser weld extends preferably next to the elevations. Suitably, the laser weld extends through the previously formed recessed structures and/or elevations.

According to another advantageous feature of the present invention, the two workpieces can be formed in their joining regions with the recessed structures and elevations and aligned such that the recessed structures and elevations of one of the workpieces are positioned in intermediate spaces of the recessed structures and elevations of the other one of the workpieces. The number of the recessed structures and elevations being formed is thus divided over both workpieces. This is beneficial in terms of heat input. The workpieces may be made of sheet metal and coated, with the recessed structures and elevations being formed on the sides of the workpieces which sides confront one another during joining.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a perspective view of two workpieces to be joined to one another by laser welding to produce a workpiece composite;

FIG. 2 is a perspective view of a lower one of the two workpieces prepared for laser welding in accordance with the present invention;

FIG. 2A is an enlarged detailed view of the area of the workpiece encircled in FIG. 2;

DETAILED DESCRIPTION OF PREFERRED EMBODIMENTS

Figure 3:
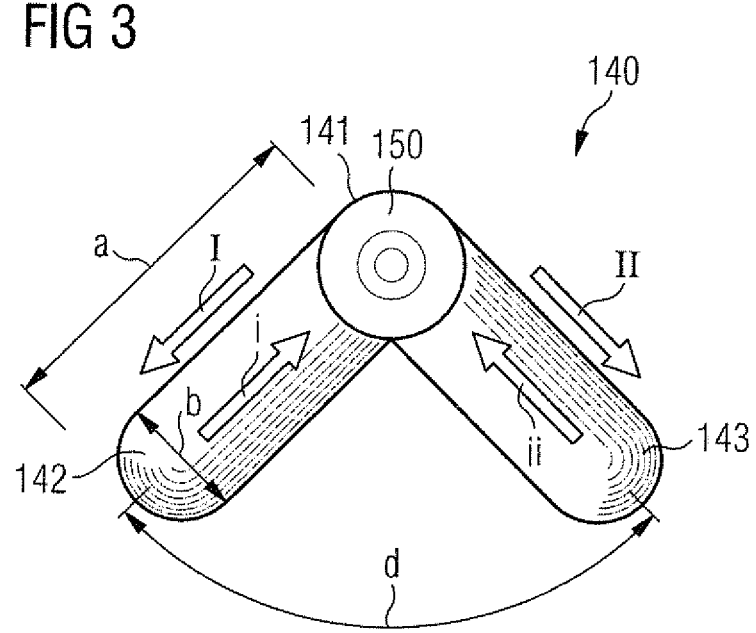
FIG. 3 is a top view of one embodiment of a recessed structure according to the invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective view of two workpieces 110, 120 to be joined to one another by a laser beam L along a path C. Although the path C is shown here as a straight line, it is, of course, also possible to guide the laser beam L along a differently configured path, e.g. curved path. The workpieces 110, 120 are arranged in the joining region with lap joint, i.e. the workpieces 110, 120 are arranged in overlapping disposition in the joining region. Reference sign U designates the overlap region. The workpieces 110, 120 may be made of sheet metal. It is also possible to produce the lower workpiece 120 of different material. At least one of the workpieces 110, 120 has on its joining side a coating, e.g. a metallic corrosion-resistant coating such as a zinc coating (galvanization). To permit during laser welding an escape of evaporating workpiece material and especially coating material and/or other welding emissions from the overlap region U, the workpieces 110, 120 to be joined are spaced from one another by a so-called degassing gap S.

The degassing gap S is realized in accordance with the present invention by several nub-like elevations 150 which, prior to subjecting the workpieces 110, 120 to laser welding, are formed by a preceding process step on at least one of the workpieces 110, 120 in a joining region F which corresponds to the overlap region U, as shown in FIGS. 2 and 2A.

FIG. 2 shows, by way of example, the lower workpiece 120 for preparation to subsequently undergo laser welding according to FIG. 1. In the joining region F, the workpiece 120 is provided on its joining side with a plurality of V-shaped recessed structures 140. The recessed structures 140, which, by way of example, are identical in configuration, are spaced from one another along a line at same distance, e.g. at a distance of 2.00 mm to 10.0 mm. It is, of course, also conceivable within the scope of the invention to arrange the recessed structures 140 in staggered disposition, or in several rows, or with opposite orientation, in the joining region F. Also different configurations of the recessed structures 140 are feasible.

As is readily apparent from the detailed view of FIG. 2A, each recessed structure 140 includes two grooved line elements 142, 143 arranged in a V shape so as to extend from a common starting point or intersection point 141, where the raised nub-like elevation 150 is formed and extends out beyond the workpiece surface. The elevation 150 serves as spacer between the workpieces 110, 120 during subsequent laser welding.

FIG. 3 shows a plan view of the recessed structure 140. The recessed structure 140 is formed by a laser beam in the workpiece surface at the joining side of the workplace 120 prior to undergoing laser welding. Starting from the common starting point, i.e. pointed end of the V, the laser beam 120 forms first the line element 142, as indicated by arrow I. Thereafter, again starting from the common starting point 141, the laser beam forms the other line element 143, as indicated by arrow II. The repeated movement of the laser beam from the common starting point 141 onward results in the area of the starting point 141 in an accumulation of solidified melt to form of the nub-like elevation 150 which extends out beyond the workpiece surface and serves as rigid spacer to establish the degassing gap S during subsequent laser welding in order to join the workpieces 110, 120.

Currently preferred is the use of scanner optics to produce the recessed structures 140 in the joining region F of the workpiece 120, with the line elements 142, 143 of a recessed structure 140 being formed in succession before the next recessed structure 140 is then formed in a same. manner. The recessed structure 140 which in plan view has a V-shaped or wedge-shaped configuration, can be realized fairly quickly, i.e. in a short time, so that the joining region F can also be worked on relatively fast and the heat input is also slight. The joining region F, in which the recessed structures 140 are formed, may also have a spatial configuration.

In the embodiment of FIG. 3, the two line elements 142, 143 of the recessed structure 140 extend in symmetry and have a length a of about 2.5 mm to 3.0 mm and a width b of about 0.8 mm to 0.9 mm. The width b may be set by a laser focus. The formation of the recessed structure 140 may hereby be realized substantially independently from the focus position because a defocussing in plus or minus Z-direction merely means a greater or smaller focus diameter, An angle d is defined between the line elements 142, 143 in V-shape and is about 90° (right angle). The elevation 150 has a height in relation to the workpiece surface of e.g. 0.05 mm to 0.5 mm.

Figure 4:
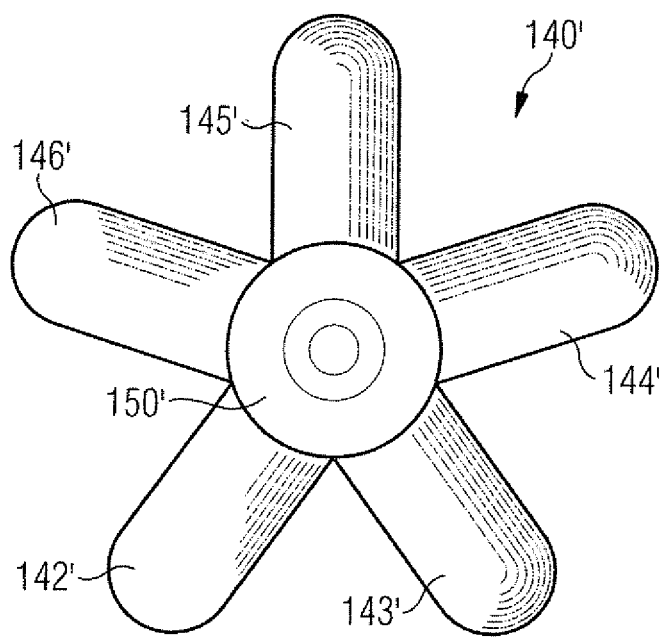
FIG. 4 is a top view of another embodiment of a recessed structure according to the invention.

FIG. 4 shows by way of example a recessed structure 140' which is formed by more than two grooved line elements, here by way of example five line elements 142', 143', 144', 145', 146', which are arranged in a star-shaped configuration. Advantageously, the line elements 142', 143', 144', 145', 146' in star-formation are spaced from one another at same angular distances and are united again in a common starting point. The presence of a greater number of line elements results in the common starting point in a more voluminous and thus more stable and higher elevation 150'. The formation of the elevation 150' is realized in a same manner as described above so that a repeated description is omitted here for the sake of simplicity.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for preparing a workpiece for subsequent laser welding, comprising moving a laser beam from a common starting point onward to produce in a surface of the workpiece a recessed structure in the form of at least two grooved line elements that meet in the common starting point and thereby accumulate solidifying material melt of the workpiece in an area of the common starting point to produce a nub-like elevation sized to extend out beyond the surface of the workpiece.

2. The method of claim 1, wherein the line elements are formed sequentially with the same laser beam.

3. The method of claim 1, wherein the line elements extend in the shape of a V, with the laser beam forming a first one of the line elements by starting from the common starting point and forming a second one of the line element also by starting from the common starting point.

4. The method of claim 3, wherein the line elements define an angle of about 90° there between.

5. The method of claim 1, wherein the recessed structure is formed by at least three grooved line elements arranged in a star-shaped configuration.

6. The method of claim 1, wherein the line elements have each a length of 1 mm to 5 mm.

7. The method of claim 1, wherein a plurality of said recessed structure is formed in the surface of the workpiece.

8. The method of claim 1, further comprising applying on the workpiece a zinc-containing coating.

9. A method of joining at least two workpieces, with at least one of the workpieces being coated, comprising:
    moving a laser beam from a common starting point onward to produce in a surface of at least one of the workpieces in a joining region with the other one of the workpieces a plurality of recessed structures, each in the form of at least two grooved line elements that meet in the common starting point and thereby accumulate solidifying material melt of the at least one of the workpieces in an area of the common starting point to produce a plurality of nub-like elevations sized to extend out beyond the surface of the at least one of the workpieces;

positioning and aligning the workpieces such as to form a degassing gap in a region of overlap of the workpieces; and joining the workpieces through laser welding, with evaporating coating material being able to escape via the degassing gap.

10. The method of claim 9, wherein both workpieces are formed in their joining regions with the plurality of recessed structures and elevations and aligned such that the recessed structures and elevations of one of the workpieces are positioned in intermediate spaces of the recessed structures and elevations of the other one of the workpieces.

11. The method of claim 9, wherein the line elements are formed sequentially with the same laser beam.

12. The method of claim 9, wherein the line elements extend in the shape of a V, with the laser beam forming a first one of the line elements by starting from the common starting point and forming a second one of the line element also starting from the common starting point.

13. The method of claim 12, wherein the line elements define an angle of about 90° there between.

14. The method of claim 9, wherein the recessed structure is formed by at least three grooved line elements arranged in a star-shaped configuration.

15. The method of claim 9, wherein the line elements have each a length of 1 mm to 5 mm.

16. The method of claim 9, wherein the workpiece is coated with a zinc-containing coating.

17. A method, comprising moving a laser beam from a same starting point onward in at least two directions in succession to produce in a surface of the workpiece a recessed structure in the form of at least two grooves and thereby build up solidifying material melt of the workpiece in an area of the starting point to produce in relation to the surface of the workpiece a nub-like elevation that serves as a spacer sufficient to define a degassing gap in an overlap region between the workpiece and another workpiece to be joined with the workpiece.

* * * * *